United States Patent
Wakabayashi et al.

(10) Patent No.: US 11,984,613 B2
(45) Date of Patent: May 14, 2024

(54) BATTERY PACK

(71) Applicant: SANYO Electric Co., Ltd., Osaka (JP)

(72) Inventors: Takeaki Wakabayashi, Hyogo (JP); Kensaku Takeda, Tokushima (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 423 days.

(21) Appl. No.: 17/422,817

(22) PCT Filed: Dec. 9, 2019

(86) PCT No.: PCT/JP2019/048016
§ 371 (c)(1),
(2) Date: Jul. 14, 2021

(87) PCT Pub. No.: WO2020/153017
PCT Pub. Date: Jul. 30, 2020

(65) Prior Publication Data
US 2022/0069409 A1    Mar. 3, 2022

(30) Foreign Application Priority Data

Jan. 25, 2019    (JP) .................................. 2019-011547

(51) Int. Cl.
*H01M 50/325*    (2021.01)
*H01M 10/056*    (2010.01)
(Continued)

(52) U.S. Cl.
CPC ....... *H01M 50/325* (2021.01); *H01M 10/056* (2013.01); *H01M 10/445* (2013.01);
(Continued)

(58) Field of Classification Search
CPC ............. H01M 50/325; H01M 10/056; H01M 10/445; H01M 50/107; H01M 50/204;
(Continued)

(56) References Cited

U.S. PATENT DOCUMENTS 9,985,259 B2 *   5/2018   Aoki ................... H01M 50/291
10,637,034 B2 *  4/2020   Takeda ................ H01M 10/613
(Continued)

FOREIGN PATENT DOCUMENTS

CN     105531846 A    4/2016
JP     2009-183359 A  8/2009
(Continued)

OTHER PUBLICATIONS

International Search Report of PCT application No. PCT/JP2019/048016 dated Feb. 25, 2020.
(Continued)

*Primary Examiner* — Abdullah A Riyami
*Assistant Examiner* — Nader J Alhawamdeh
(74) *Attorney, Agent, or Firm* — WHDA, LLP (57) ABSTRACT

A battery pack includes battery cell having a discharge valve opened when an internal pressure exceeds a set pressure, and case housing battery cell. Case has opening, and opening is blocked by porous plate made of resin. Porous plate has a plurality of through-holes, an expansion gap of a discharge gas is formed by stacking a plurality of the porous plates, through-holes provided in each of porous plates are arranged at non-facing positions not facing through-holes provided in adjacent another porous plate, and the discharge gas of the discharge valve passes through through-holes provided in porous plates and the expansion gap and is discharged to an outside of the case.

11 Claims, 8 Drawing Sheets

(51) Int. Cl.
   *H01M 10/44* (2006.01)
   *H01M 50/107* (2021.01)
   *H01M 50/204* (2021.01)
   *H01M 50/213* (2021.01)
   *H01M 50/247* (2021.01)

(52) U.S. Cl.
   CPC ....... *H01M 50/107* (2021.01); *H01M 50/204* (2021.01); *H01M 50/213* (2021.01); *H01M 50/247* (2021.01)

(58) Field of Classification Search
   CPC .. H01M 50/213; H01M 50/247; H01M 50/24; H01M 50/317; H01M 50/358; H01M 10/052; H01M 50/242; Y02E 60/10
   See application file for complete search history.

(56) References Cited

U.S. PATENT DOCUMENTS

| | | | |
|---|---|---|---|
| 2009/0197153 A1 | 8/2009 | Fujikawa et al. | |
| 2012/0015227 A1* | 1/2012 | Hwang | H01M 50/40 429/99 |
| 2016/0141573 A1* | 5/2016 | Aoki | H01M 50/512 429/53 |
| 2016/0204404 A1 | 7/2016 | Shimizu et al. | |
| 2017/0301905 A1* | 10/2017 | Takeda | H01M 50/529 |
| 2018/0241017 A1* | 8/2018 | Nakamura | H01M 50/202 |
| 2022/0069409 A1* | 3/2022 | Wakabayashi | H01M 10/056 |
| 2022/0085453 A1* | 3/2022 | Wakabayashi | H01M 50/247 |
| 2022/0123428 A1* | 4/2022 | Wakabayashi | H01M 50/247 |

FOREIGN PATENT DOCUMENTS

| | | |
|---|---|---|
| JP | 2009-212081 | 9/2009 |
| JP | 2016-035817 A | 3/2016 |

OTHER PUBLICATIONS

The Extended European Search Report dated Feb. 17, 2022, issued in counterpart EP Application No. 19911251.7. (8 pages).

English Translation of Chinese Office Action dated Jan. 27, 2024, issued in counterpart CN application No. 201980088999.0. (4 pages).

* cited by examiner

BATTERY PACK

CROSS-REFERENCE TO RELATED APPLICATIONS

This application is a U.S. national stage application of the PCT International Application No. PCT/JP2019/048016 filed on Dec. 9, 2019, which claims the benefit of foreign priority of Japanese patent application No. 2019-011547 filed on Jan. 25, 2019, the contents all of which are incorporated herein by reference.

TECHNICAL FIELD

The present invention relates to a battery pack that houses a battery that can be charged in an exterior case.

BACKGROUND ART

In recent years, a battery pack used as a power supply of a portable electric device has been further required to have a high output, and a non-aqueous electrolyte secondary battery such as a lithium-ion battery having excellent efficiency per unit volume has been adopted. Although the lithium-ion battery has a high output, an internal pressure may increase for some reason. In order to ensure safety against an increase in the internal pressure of the battery, a discharge valve opened at a set pressure to prevent rupture is provided. When the discharge valve is opened, the battery is in an abnormal heat generation state, and a high-temperature gas is vigorously ejected from the discharge valve. A battery pack in which a vent hole is provided in a case and a mesh member made of metal is provided in the vent hole in order to discharge a discharge gas discharged from a discharge valve to the outside of the case has been developed.

CITATION LIST

Patent Literature

PTL 1: Unexamined Japanese Patent Publication No. 2009-212081

SUMMARY OF THE INVENTION

In the battery pack of PTL 1, the metal mesh member is provided in the vent hole of the exterior case, and the discharge gas ejected from the discharge valve is quickly discharged to the outside. In this battery pack, it is difficult to safely discharge the high-temperature discharge gas vigorously ejected from the battery cell to the outside. In particular, since the discharge gas ejected from the discharge valve of the lithium-ion battery which is the non-aqueous electrolyte secondary battery is vigorously ejected at an abnormally high temperature of 400° C. or higher, adverse effects such as smoking, ignition, and the like of the gas passed through the mesh member and discharged to the outside on the outside of the case cannot be guaranteed.

The present invention has been made based on such findings of the present inventors. A main object of the present invention is to provide a battery pack that ensures safety by suppressing adverse effects caused by a high-temperature discharge gas ejected from a discharge valve of a battery.

A battery pack of the present invention includes battery cell 1 having a discharge valve opened when an internal pressure exceeds a set pressure, and case 2 housing battery cell 1. Case 2 has opening 26, and opening 26 is blocked by porous plate 5 made of resin. Porous plate 5 has a plurality of through-holes 5a, expansion gap 8 of a discharge gas is formed by stacking a plurality of porous plates 5, through-holes 5a provided in each of porous plates 5 are arranged at non-facing positions not facing through-holes 5a provided in adjacent another porous plate 5, and the discharge gas of the discharge valve passes through through-holes 5a provided in porous plates 5 and expansion gap 8 and is discharged to an outside of the case.

The above battery pack can enhance safety by suppressing adverse effects caused by the high-temperature discharge gas ejected from the discharge valve of the battery cell. This is because in the above battery pack, the porous plates as the plastic plates having a large number of through-holes are provided in the opening of the case, the plurality of porous plates is stacked with the expansion gap, the through-holes of the stacked porous plates are arranged at the non-facing positions, and the discharge gas passes through the through-holes of the porous plates, diffuses while being adiabatically expanded in the expansion gap, further passes through the through-holes, and is discharged to the outside of the case. The discharge gas exhausted to the outside of the case in the above state is ejected from the battery cell, is dispersed in and passes through the plurality of through-holes provided in the porous plates inside the case, and passes through the through-holes. Thereafter, the discharge gas is ejected into the expansion gap, and is adiabatically expanded. The temperature of the discharge gas is lowered, and the discharge gas collides with the surface of the stacked porous plate on the discharge side. Thereafter, the discharge gas is dispersed, the energy is attenuated, and the discharge gas is exhausted to the outside of the case even in the state of passing through the through-holes of the porous plates. The discharge gas passes through the plurality of through-holes, and is redirected by colliding with the surface of the porous plate on the discharge side while the discharge gas is decreased in temperature by being adiabatically expanded in the expansion gap. The energy is attenuated even while the discharge gas is dispersed, the path through which the discharge gas passes is lengthened, and the discharge gas is dispersed in the large number of through-holes and is discharged to the outside. Thus, the discharge gas is not vigorously exhausted to the outside of the case in a state of being discharged to the outside of the case, and safety can be enhanced by suppressing adverse effects such as smoking and ignition.

DESCRIPTION OF EMBODIMENTS

A first invention of the present invention is a battery pack including a battery cell having a discharge valve opened when an internal pressure exceeds a set pressure, and a case housing the battery cell. The case has an opening, the opening is blocked by a porous plate made of resin, the porous plate has a plurality of through-holes, an expansion gap of a discharge gas is formed by stacking a plurality of the porous plates, the through-holes provided in the porous plate are arranged at non-facing positions not facing the through-holes provided in adjacent another porous plate, and the discharge gas of the discharge valve passes through the through-holes provided in the porous plates and the expansion gap and is discharged to an outside of the case.

In a second invention of the present invention, each of the porous plates stacked on top of each other has a rectangular shape, the porous plates are stacked on inside out with a diagonal line of the rectangular shape as a symmetric axis, and the through-holes of the stacked porous plates are arranged at non-facing positions. In a third invention of the present invention, each of the porous plates has a square shape. The battery pack having this structure has an advantage that since the through-holes can be arranged at the non-facing positions by stacking the porous plates having the same shape, it is possible to produce a large amount of battery pack while reducing manufacturing cost.

In a fourth invention of the present invention, the through-holes of the porous plates stacked on an inner side of the case are larger than the through-holes of the porous plates stacked on an outer side of the case. In the battery pack having this structure, since the through-holes of the porous plate on the inner side through which the discharge gas ejected from the discharge valve first permeates is set to be larger than the porous plate on the outer side, the discharge gas ejected from the discharge valve can smoothly pass through the through-holes and can be quickly exhausted to the outside of the case.

In a fifth invention of the present invention, each of the porous plate is integrally molded with protrusions, and the expansion gap is formed in a state in which the porous plates are stacked. In the battery pack having this structure, the expansion gap can be easily and accurately provided at a predetermined interval by the protrusions in a state in which the plurality of porous plates is stacked.

In a sixth invention of the present invention, an inner diameter of each of the through-holes of each of the porous plates is equal to or more than 0.5 mm and is equal to or less than 3 mm. In the structure in which the through-hole of the porous plate has the inner diameter as described above, the discharge gas can be smoothly discharged to the outside of the case while the permeation resistance of the discharge gas is increased.

In a seventh invention of the present invention, the case is a rectangular cuboid obtained by coupling peripheral walls around a surface plate having a square shape, the battery cell is disposed in parallel with the surface plate, and is housed in a state in which a valve side end surface on which the discharge valve is provided faces an inside of the peripheral wall, and the porous plates are provided on the surface plate. In the battery pack having this structure, since an ejection direction of the discharge gas ejected from the battery cell and a direction in which the discharge gas passes through the through-holes of the porous plates are set to directions intersecting each other, the discharge gas ejected from the battery cell can be discharged to the outside while the discharge gas is redirected in the case, and the energy of the discharge gas can be efficiently attenuated.

In an eighth invention of the present invention, in each of the porous plates, the through-holes are provided at intersections of a checkerboard lattice. In the battery pack having this structure, the through-holes of the porous plates stacked on top of each other and facing each other can be efficiently arranged at the non-facing positions while a large number of through-holes are efficiently provided in the porous plates.

In a ninth invention of the present invention, a label peeled off or melted by the discharge gas discharged from the discharge valve is attached to a surface of the porous plate in the case. In this battery pack, since the discharge side of the porous plate is blocked by the label, it is possible to effectively prevent foreign substances from passing through the through-holes of the porous plates from the outside to the inside of the case.

In a tenth invention of the present invention, the battery cell is a non-aqueous electrolyte secondary battery. In an eleventh invention of the present invention, the battery cell is a lithium-ion battery.

Hereinafter, the present invention will be described in detail with reference to the drawings. In the following description, terms (for example, "upper", "lower", and other terms including these terms) indicating specific directions and positions are used as necessary, but these terms are used to facilitate understanding of the invention with reference to the drawings, and the technical scope of the present invention is not limited by the meanings of these terms. Parts denoted by identical reference marks in a plurality of drawings indicate identical or equivalent parts or members.

The following exemplary embodiments illustrate specific examples of the technical idea of the present invention, and do not limit the present invention to the following exemplary embodiments. Unless otherwise specified, dimensions, materials, shapes, relative arrangements, and the like of constituent components to be described below are not intended to limit the scope of the present invention, but are intended to be illustrative. Contents described in one exemplary embodiment and example are also applicable to other exemplary embodiments and examples. Sizes, positional relationships, and the like of members illustrated in the drawings may be exaggerated in order to clarify the description.

First Exemplary Embodiment

Battery pack 100 illustrated in FIGS. 1 to 4 includes a plurality of chargeable battery cells 1, circuit board 3 on which a protective circuit and the like of battery cells 1 are mounted, and case 2 housing battery cells 1 and circuit board 3.

(Battery Cell 1)

Battery cell 1 is a battery having a cylindrical shape. In the cylindrical battery, an electrode and an electrolytic solution are housed in a metal case having a cylindrical shape. The metal case has a sealed structure in which a sealing plate is airtightly fixed to an opening of an exterior can blocking a bottom. The exterior can is manufactured by pressing a metal plate. The sealing plate is airtightly fixed by being crimped to a peripheral edge of the opening of the exterior can with an insulating packing interposed therebetween.

Although not illustrated, a discharge valve on the sealing plate is provided in battery cell 1 in order to prevent damage due to an abnormally high internal pressure of the metal case. In the discharge valve, an opening through which an internal gas and the like are discharged in an opened state is provided in the sealing plate. However, in the battery cell, the discharge valve and the opening thereof may be provided at a bottom portion of the exterior can. When the internal pressure becomes higher than a set pressure, for example, 1.5 MPa, the discharge valve is opened to prevent destruction of the metal case due to an increase in the internal pressure. The discharge valve is opened in an abnormal state. Accordingly, in a state in which the discharge valve is opened, a temperature of battery cell 1 is also very high. Thus, the gas and the electrolytic solution (ejected matter) discharged from the opened discharge valve have an abnormal high temperature. Particularly, in a battery pack in which battery cell 1 is a non-aqueous electrolyte secondary battery such as a lithium-ion battery, a discharge gas has an abnormal high temperature of 400° C. or higher. Since the lithium-ion battery is filled with a non-aqueous electrolytic solution, when the electrolytic solution is discharged to the outside of the case at a high temperature, the electrolytic solution may be ignited by being in contact with air, and may have an abnormal higher temperature. In not only the lithium-ion battery but also other chargeable batteries, since the discharge gas ejected from the opened discharge valve has a high temperature, it is important to attenuate the energy of the discharge gas and exhaust the discharge gas to the outside of the case for enhancing safety.

In battery pack 100 of FIGS. 1 to 4, a plurality of battery cells 1 is arranged at fixed positions in battery holders 4, and is arranged in the case as battery block 10. Battery block 10 includes two sets of battery assemblies 11. In battery assembly 11, battery cells 1 are arranged at fixed positions by inserting battery cells 1 into battery holders 4. In battery holder 4, battery cells 1 are arranged in four rows in parallel to side wall 23 of case 2. Battery block 10 in which two sets of battery assemblies 11 are arranged in two stages in a longitudinal direction of case 2 and eight battery cells 1 are connected in series and in parallel in four rows and two stages is provided. Each battery assembly 11 is disposed in the case such that the openings of the discharge valves of two battery cells 1 face end wall 24 of case 2. In battery pack 100 in the drawing, battery assembly 11 includes four battery cells 1, battery block 10 includes two sets of battery assemblies 11, and battery block 10 is disposed in the case. However, the battery pack of the present invention does not specify a number or connection state of the battery cells housed in the case.

(Circuit Board 3)

An electronic component (not illustrated) connected to battery cells 1 to achieve a protection circuit for battery cells 1 is mounted on circuit board 3. The protection circuit is a circuit that prevents overcharge and overdischarge of battery cells 1, a circuit that prevents overcurrent, or a circuit that interrupts current in a state in which the temperature rises abnormally. In battery pack 100 illustrated in FIGS. 1 and 2, circuit board 3 is vertically disposed between peripheral wall 22 and battery block 10, particularly at a position facing side wall 23 inside case 2. As described above, circuit board 3 is disposed so as to face side wall 23 intersecting end wall 24 facing the discharge valve of battery cell 1, and thus, the discharge gas ejected from the discharge valve can be smoothly guided to through-hole 5a of porous plate 5 by providing gap for causing the discharge gas to pass between porous plate 2 and battery block 10 while the discharge gas ejected from battery cell 1 is prevented from being directly ejected to circuit board 3.

(Case 2)

Case 2 is made of a thermoplastic resin, is molded in a rectangular box shape as a whole, and has battery cells 1 and circuit board 3 built therein. Case 2 in the drawing includes upper case 2A and lower case 2B. At lower case 2B and upper case 2A, peripheral wall 22 is provided around surface plate 21 having a quadrangular shape. Lower case 2B and upper case 2A are coupled with opening end surfaces of peripheral wall 22 as mating surfaces. Peripheral wall 22 of lower case 2B and upper case 2A includes side walls 23 on both sides extending in a longitudinal direction of rectangular surface plate 21 and end walls 24 orthogonal to side walls 23. Heat-resistant covers 6 is arranged inside end walls 24 facing the openings of the discharge valves. Heat-resistant cover 6 is a heat-resistant plate or sheet that withstands the temperature of the discharge gas. Heat-resistant cover 6 prevents the discharge gas ejected from the discharge valve from being directly ejected to end wall 24, and scatter the discharge gas in all directions. A case having end walls made of a heat-resistant material can scatter the discharge gas around by end walls without providing the heat-resistant covers.

In case 2, opening 26 is provided in surface plate 21, and resin porous plate 5 having a plurality of through-holes 5a is disposed in opening 26. In case 2 of FIGS. 1 to 4, opening 26 is formed on substantially the entire surface of surface plate 21 of upper case 2A. In battery pack 100, since the discharge gas can be smoothly exhausted by increasing opening 26 of case 2, an opening area of opening 26 is preferably 40% or more, more preferably 50% or more of surface plate 21. In case 2 in this drawing, the opening area of opening 26 is increased by providing opening 26 having a rectangular shape in rectangular surface plate 21.

(Porous Plate 5)

Opening 26 is blocked by porous plate 5 in which the discharge gas can pass. Porous plate 5 is bonded and fixed to surface plate 21 by a structure such as adhesion or welding, or is fixed by a fitting structure. Porous plate 5 is fixed so as not to form a gap between the porous plate and opening 26. The plurality of porous plates 5 is stacked so as to attenuate and exhaust the energy of the discharge gas. Expansion gap 8 of the discharge gas is provided between stacked porous plates 5. Through-holes 5a of each of stacked porous plates 5 have a structure in which through-holes 5a of adjacent porous plates 5 are arranged at non-facing positions not facing each other and the discharge gas does not flow linearly through the plurality of porous plates 5 to be exhausted. Porous plate 5 is obtained by molding a thermoplastic resin into a plate shape, and a plurality of through-holes 5a is provided in the porous plate.

Plastic having heat resistance capable of attenuating the energy of the discharge gas and exhausting the discharge gas to the outside is used as porous plate 5. Although it is ideal that porous plate 5 is molded by plastic having heat resistance that is not thermally deformed by the temperature of the discharge gas, the structure in which the plurality of porous plates 5 is stacked with expansion gap 8 may not have heat resistance that all porous plates 5 are not thermally deformed by the discharge gas. This is because even though porous plate 5 on the inner side is thermally deformed, the safety of the battery pack can be ensured by maintaining a state in which porous plate 5 on the outer side can attenuate and exhaust the discharge gas by the plurality of remaining through-holes 5a. There are characteristics that porous plate 5 obtained by stacking a plurality of sheets can be produced in large quantities at low cost by injection molding with a thermoplastic resin such as polycarbonate. However, the present invention does not specify the plastic of porous plate 5, and the porous plate can be molded with a thermoplastic resin having more excellent heat resistance, for example, a thermoplastic resin such as a nylon resin or a fluorocarbon resin, and can also be molded with plastic having more excellent heat resistance such as a silicone resin or a polyimide resin.

Figure 5:
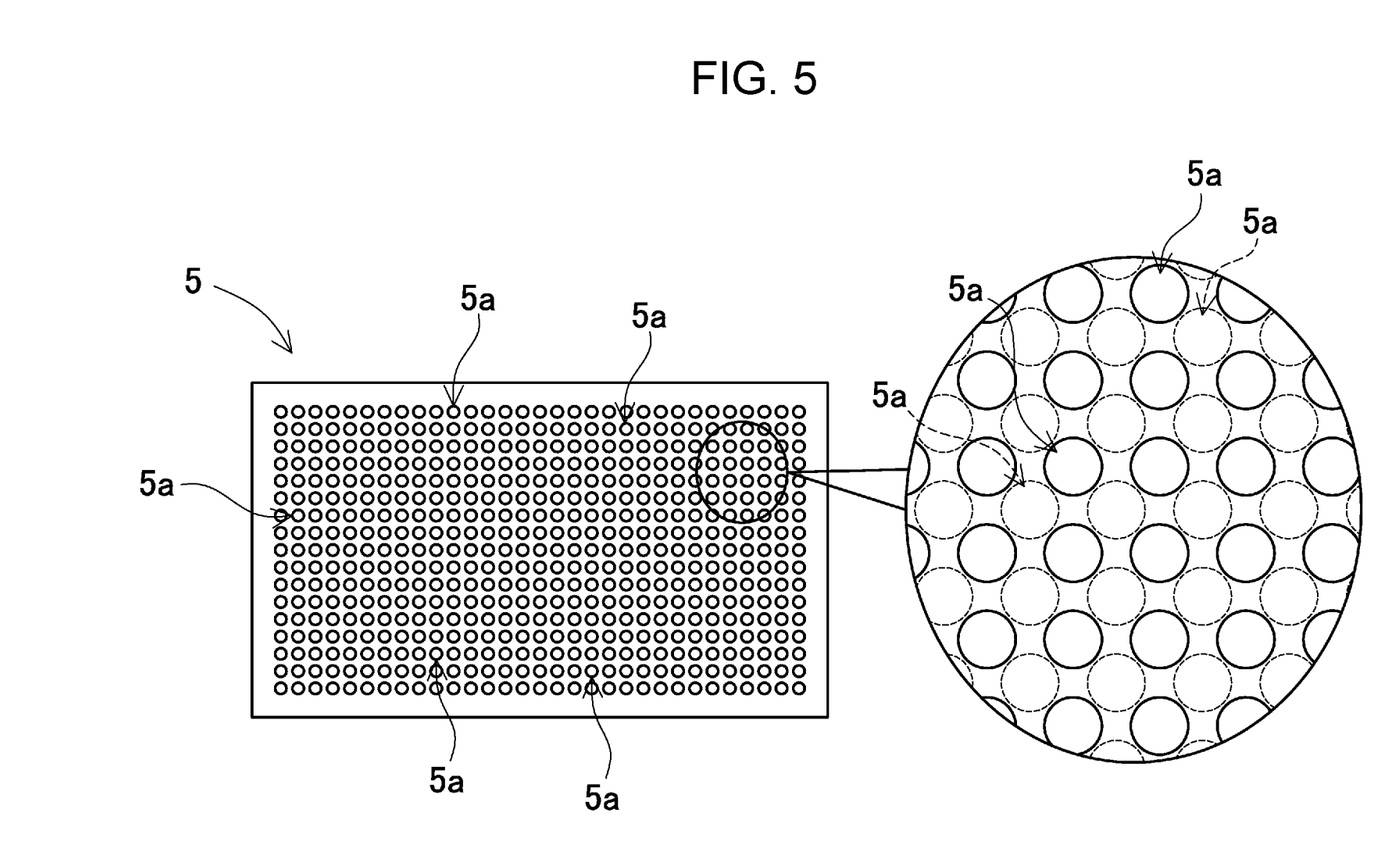
FIG. 5 is a partially enlarged plan view illustrating a stacked state of porous plates.

In porous plate 5 illustrated in plan view of FIG. 5, through-holes 5a each having a circular shape are arranged at intersections of the checkerboard lattice such that vertical and horizontal pitches of through-holes 5a are constant. Through-holes 5a can increase the permeation resistance of the discharge gas by reducing the size, but when the flue gas hole is too small, since the discharge gas cannot be smoothly exhausted to the outside of the case, the inner diameter is preferably 0.5 mm to 3 mm, more preferably 1 mm to 2 mm. The discharge gas vigorously ejected from the discharge valve first permeates through porous plate 5 stacked on the innermost side of case 2. In this porous plate 5, through-hole 5a is set to be larger than other porous plates 5, and thus, the discharge gas ejected from the discharge valve can smoothly permeate through through-hole 5a. However, through-holes 5a of all porous plates 5 may have the same size. The discharge gas having permeated through through-holes 5a is ejected into expansion gap 8, and is adiabatically expanded. The temperature of the discharge gas adiabatically expanded in expansion gap 8 decreases. In the structure in which three or more porous plates 5 are stacked, since expansion gap 8 is formed in a plurality of layers, whenever the discharge gas permeates through through-holes 5a and flows into expansion gap 8, the discharge gas is adiabatically expanded to decrease the temperature.

Since porous plate 5 can lengthen through-hole 5a to increase the permeation resistance of the discharge gas by increasing a thickness, the thickness of porous plate 5 is preferably 1 mm to 3 mm. However, in the present invention, the inner diameter of through-hole 5a and the thickness of porous plate 5 are not specified to the above ranges, and the porous plate can have a shape in which the energy of the discharge gas is attenuated to exhaust the discharge gas by providing a plurality of smaller through-holes or a small number of larger through-holes and thinning or thickening the porous plate. The pitch of through-holes 5a is set to a dimension in which through-holes 5a of facing porous plates 5 are arranged at non-facing positions and a part of through-holes 5a is not arranged at a facing position of stacked porous plates 5. As illustrated in the plan view of FIG. 5, porous plates 5 in which through-holes 5a are arranged in a checkerboard lattice shape are arranged at positions at which four through-holes 5a provided in porous plate 5 to be stacked do not overlap each other around through-holes 5a provided in one porous plate 5. However, a structure in which the energy of the discharge gas can be attenuated and the discharge gas can be safely exhausted to the outside can also be adopted as a structure in which a part of through-holes 5a provided in porous plates 5 arranged to face each other is arranged at positions overlapping with each other. This is because most of the discharge gas having permeated through through-holes 5a collides with the surface of stacked porous plates 5 and the energy is attenuated.

Figure 6:
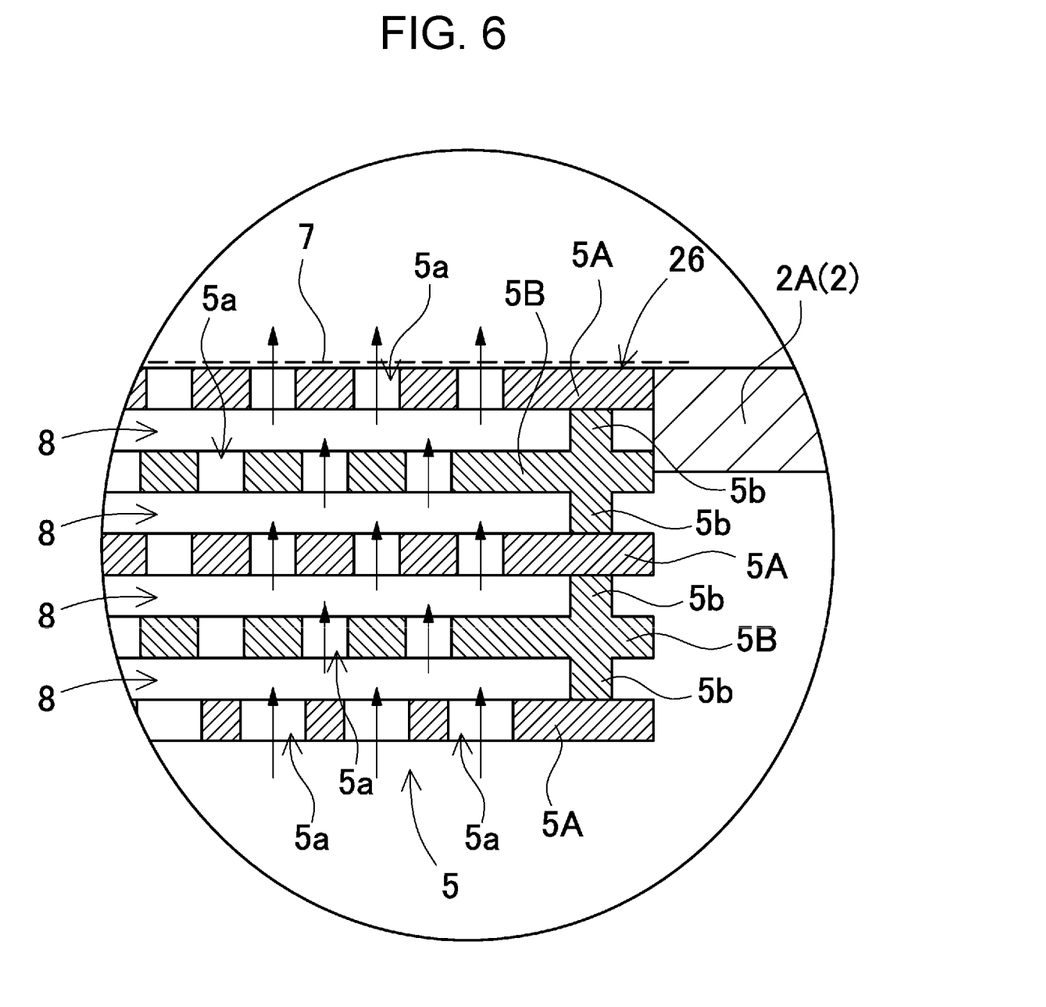
FIG. 6 is an enlarged cross-sectional view illustrating the stacked state of the porous plates.
Figure 7:
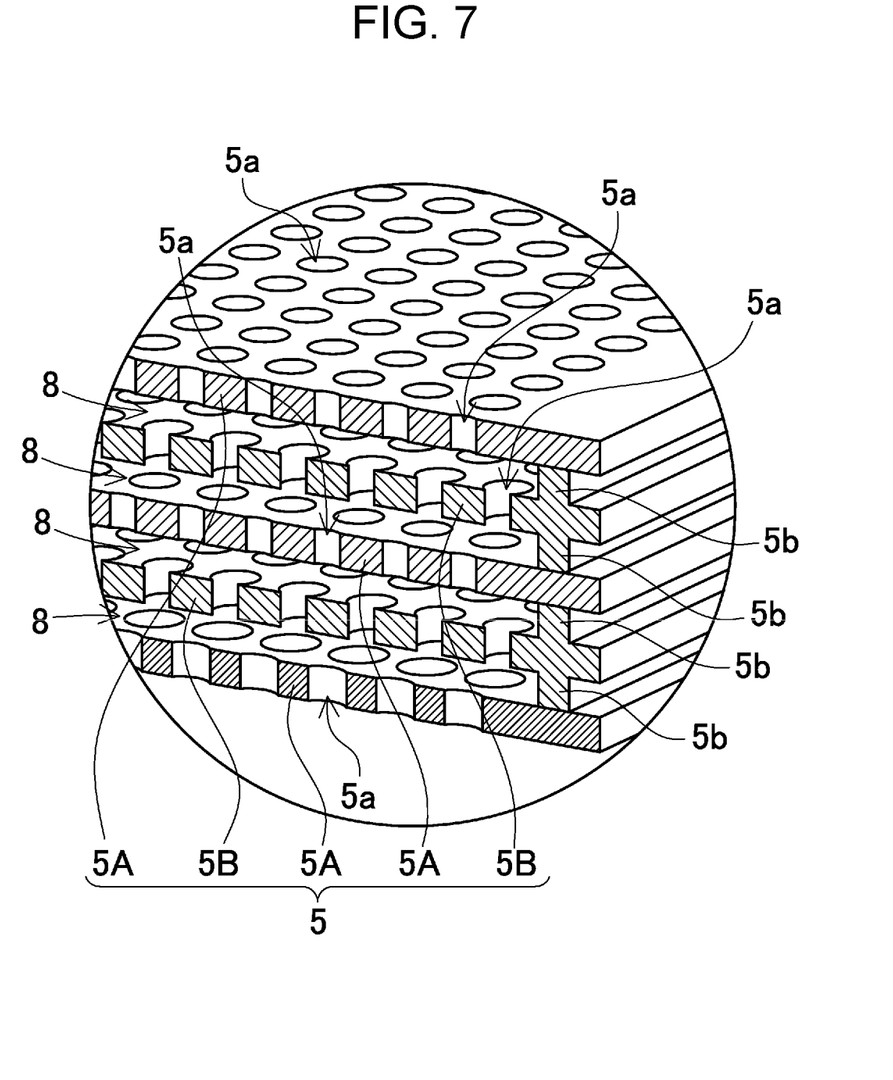
FIG. 7 is an enlarged cross-sectional perspective view illustrating the stacked state of the porous plates.

As illustrated in FIGS. 6 and 7, porous plates 5 are stacked and provided such that protrusions 5b are integrally molded on the surface and expansion gap 8 having a certain gap is formed. Protrusions 2b illustrated in the drawing are spacer ribs integrally molded along side edges of the porous plate. A protrusion height of protrusion 2b which is the spacer rib specifies a dimension of expansion gap 8. In porous plate 5 illustrated in a cross-sectional view of FIG. 6, expansion gap 8 is substantially equal to the thickness of porous plate 5, but expansion gap 8 may be narrower or wider than the thickness of porous plate 5. Narrow expansion gap 8 can more effectively attenuate the energy of the discharge gas by increasing the permeation resistance of the discharge gas, but cannot smoothly exhaust the discharge gas. When expansion gap 8 is widened, the plurality of porous plates 5 is stacked and thickened. Accordingly, expansion gap 8 is set to have a dimension, for example, 2 mm to 5 mm which allows the discharge gas to be smoothly exhausted while entire stacked porous plates 5 is set to be as thin as possible and can further safely discharge the discharge gas by preventing adverse effects such as ignition.

Protrusions 2b are scattered and arranged on an outer periphery of porous plate 5 and are also arranged in a central portion if necessary, and can be stacked while expansion gap 8 is set to be constant. FIGS. 6 and 7 illustrate porous plates 5 stacked in five layers. In porous plates 5 illustrated in these drawings, two types of porous plates 5 including planar porous plate 5A and intermediate porous plate 5B are alternately stacked. In planar porous plate 5A and intermediate porous plate 5B, through-holes 5a are provided at positions not facing each other, that is, at non-facing positions. Intermediate porous plate 5B is provided by integrally molding protrusions 5b protruding from both surfaces. Porous plates 5 having this shape can be stacked by alternately stacking two types of porous plates 5, arranging through-holes 5a at the non-facing positions, and providing constant expansion gap 8 between porous plates 5. Porous plates 5 illustrated in FIGS. 6 and 7 have a 5-layer stacked structure by stacking three planar porous plates 5A and two intermediate porous plates 5B. Planar porous plates 5A are stacked on both surfaces and in the middle, and intermediate porous plates 5B are stacked between planar porous plates 5A. This structure can be a stacked structure in which the number of stacked sheets is an odd number by alternately stacking porous plates 5 made of plastic and molded in two types of shapes. In porous plates 5 illustrated in FIGS. 6 and 7, through-holes 5a provided in planar porous plate 5A disposed on an innermost side are set to be larger than through-holes 5a of other porous plates 5. As described above, in battery pack 100 in which through-holes 5a of porous plate 5 stacked on the innermost side of case 2 are enlarged, since only porous plates 5 stacked on the innermost side are molded separately, three or more odd-numbered layers can be stacked by stacking porous plates 5 molded in three types of shapes.

Although not illustrated, the porous plate can be formed into a shape in which the through-holes can be arranged at non-facing positions by alternately stacking porous plates molded in an identical shape with a diagonal line with as a symmetry axis. This porous plate has, for example, a square outer shape, and thus, the through-holes can be arranged at non-facing positions while a plurality of porous plates is ideally stacked. The porous plates can also be molded such that the through-holes can be arranged at non-facing positions in a state in which the porous plates formed in the identical shape are stacked inside out with left and right center lines as symmetry axes or are stacked inside out with upper and lower center lines as symmetry axes. In this structure, for example, the porous plates each having the rectangular outer shape are alternately inverted and stacked, and thus, the through-holes can be arranged at the non-facing positions. The porous plates can also be molded such that the through-holes can be arranged at the non-facing positions by rotating the porous plates by 90 degrees or 180 degrees in a horizontal plane and stacking the porous plates formed in the identical shape. These porous plates have an advantage that a large amount of production can be performed while manufacturing cost is reduced since the through-holes can be arranged at the non-facing positions in a state in which the plurality of stacked plates is stacked while the porous plates having the identical shape are used.

Although not illustrated, in the porous plates stacked vertically and coupled to each other, positioning recesses and positioning protrusions fitted to each other can be provided at positions facing each other on the porous plates. In this structure, the positioning recesses and the positioning protrusions are fitted, and thus, the stacked porous plates can be coupled while being easily and reliably positioned. In particular, in the porous plates in which the through-holes can be arranged at the non-facing positions by stacking the upper and lower porous plates in a specific orientation, the stacked porous plates can be reliably coupled in a correct direction by fitting the positioning recesses and the positioning protrusions to each other, and thus, the through-holes can be ideally arranged at the non-facing positions.

In battery pack 100, diffusion space 25 is provided inside case 2. In battery pack 100, the discharge gas ejected from the discharge valve is ejected into diffusion space 25, and the energy is attenuated in diffusion space 25. Thereafter, the energy is attenuated in through-holes 5a provided in stacked porous plates 5 and expansion gap 8 provided between porous plates 5, and the discharge gas is discharged to the outside of the case. Through-holes 5a attenuate the energy of the discharge gas by the permeation resistance through which the discharge gas permeates, and expansion gap 8 causes the discharge gas having permeated through through-holes 5a to collide with the surfaces of porous plates 5 and attenuates the energy of the discharge gas.

Figure 4:
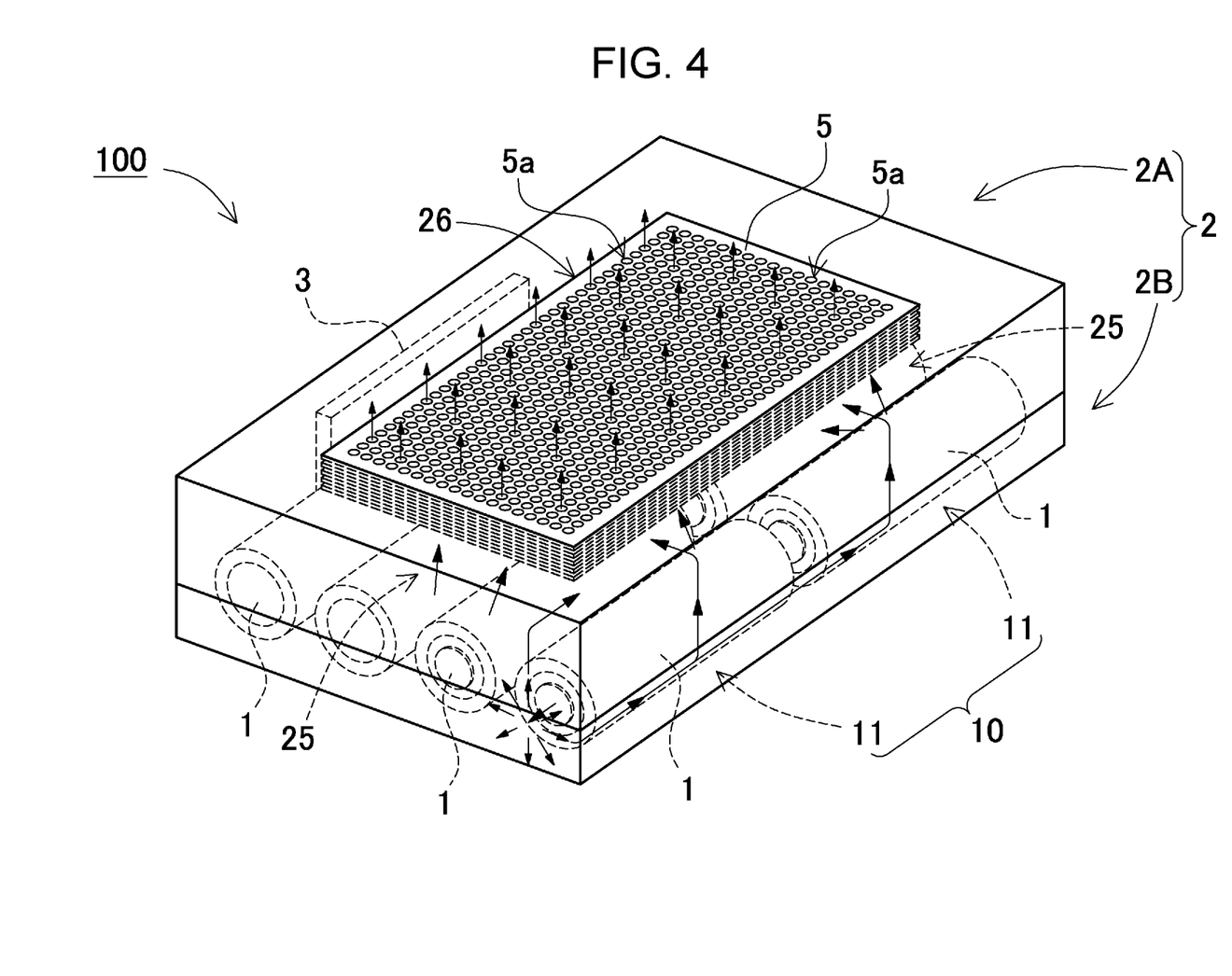
FIG. 4 is a schematic perspective view illustrating the internal structure of the battery pack according to the first exemplary embodiment of the present invention.

Battery pack 100 illustrated in a schematic perspective view of FIG. 4 is disposed in a direction in which an ejection direction of the discharge gas ejected from battery cells 1 and a direction in which the discharge gas permeates through through-holes 5a of porous plates 5 intersect each other. Battery cells 1 extend in the longitudinal direction of rectangular surface plate 21, and porous plates 5 are arranged in parallel to surface plate 21 so as to block opening 26 provided in surface plate 21. The battery cells eject the discharge gas from the opened discharge valves in a surface direction of surface plate 21, and through-holes 5a causes the discharge gas to permeate in a direction orthogonal to surface plate 21 and exhausts the discharge gas. That is, the ejection direction of the discharge gas and the exhaust direction of through-holes 5a intersect each other, and are directions orthogonal to each other in the drawing. Thus, the discharge gas is redirected in the case, and is exhausted to the outside.

The discharge gas ejected into the case from the discharge valves flows in directions indicated by arrows in FIG. 4 and is exhausted to the outside of the case. In the discharge valves of battery cells 1, the openings are arranged to face end walls 24 of case 2. The discharge gas ejected from the discharge valves is ejected toward end walls 24. Since heat-resistant covers 6 are arranged inside end walls 24, the discharge gas collides with heat-resistant covers 6 and is scattered around. The discharge gas that has collided with heat-resistant covers 6 flows into diffusion space 25 and is diffused. As indicated by the arrows in the drawing, the discharge gas flowing into diffusion space 25 collides with an inner surface of case 2, is dispersed, is redirected, and is exhausted to the outside from through-holes 5a. As indicated by arrows in FIG. 4, the discharge gas collides with the inner surface of case 2, is dispersed, and is redirected. The energy of the discharge gas is attenuated, and the discharge gas permeates through through-holes 5a. The energy of the discharge gas is further attenuated by through-holes 5a and expansion gap 8, and the discharge gas is exhausted to the outside of the case. The structure in which the energy of the discharge gas is attenuated and the discharge gas is exhausted to the outside of the case can improve safety by suppressing adverse effects such as ignition outside the case.

Figure 1:
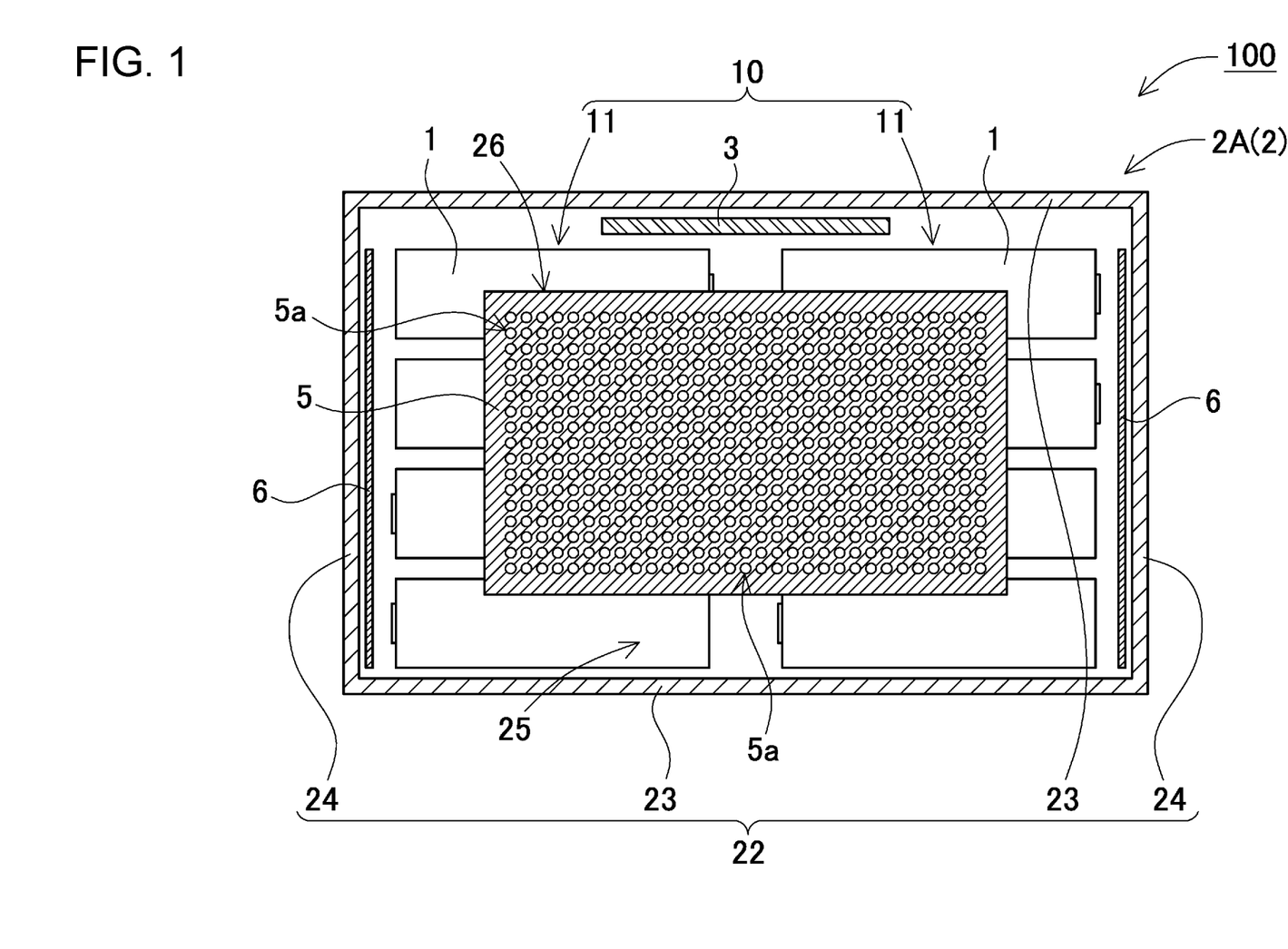
FIG. 1 is a schematic horizontal cross-sectional view illustrating an internal structure of a battery pack according to a first exemplary embodiment of the present invention.
Figure 2:
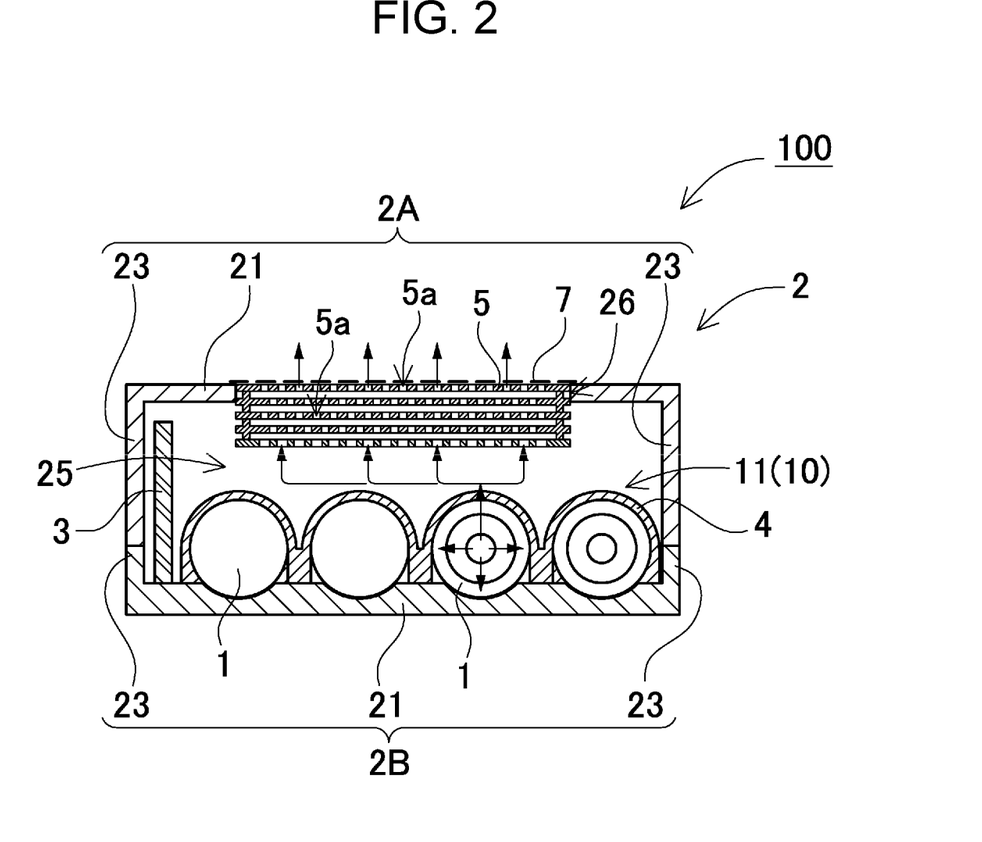
FIG. 2 is a vertical transversal cross-sectional view of the battery pack according to the first exemplary embodiment of the present invention.
Figure 3:
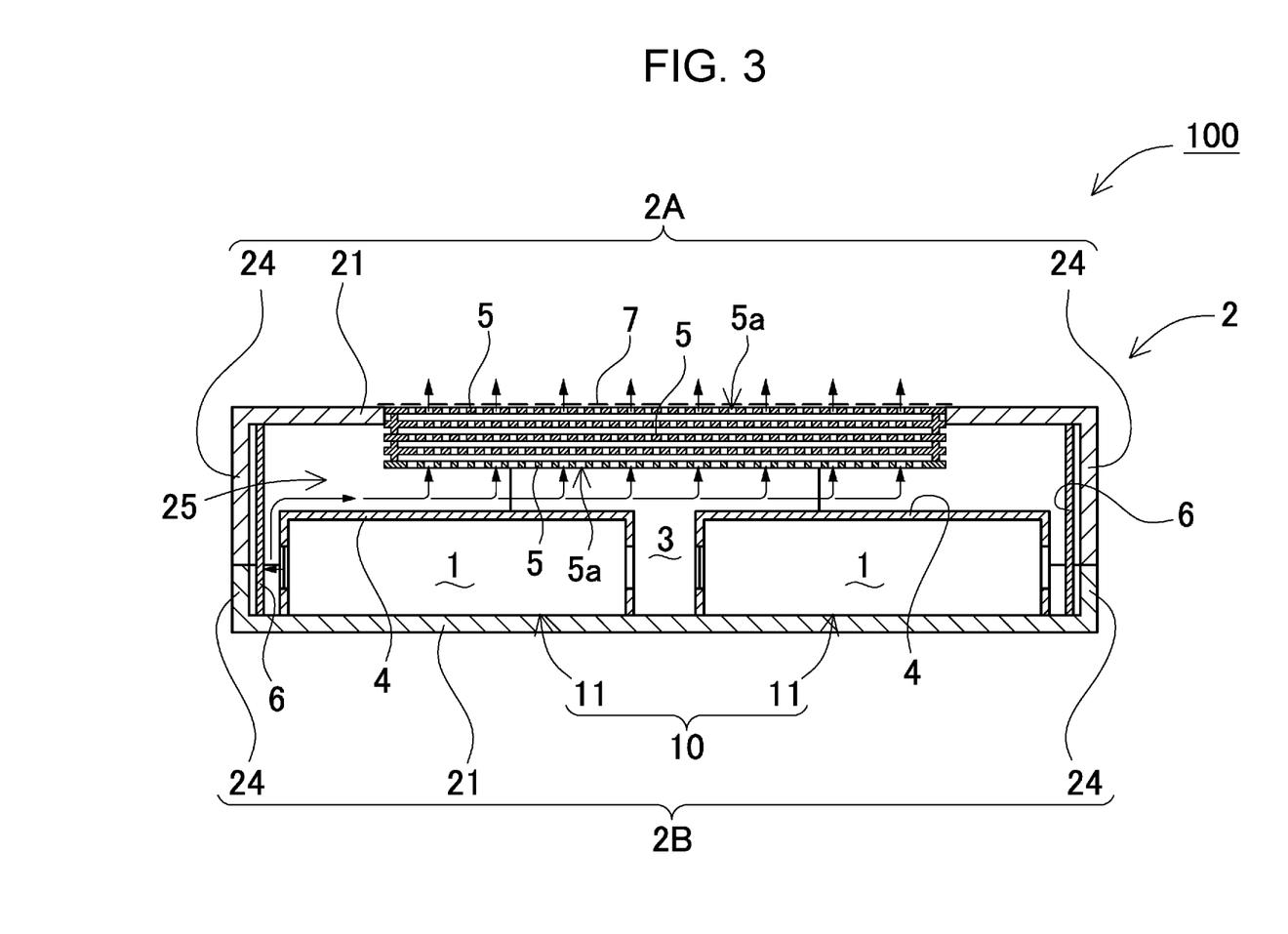
FIG. 3 is a vertical longitudinal sectional view of the battery pack according to the first exemplary embodiment of the present invention.

In case 2 illustrated in FIGS. 2 and 3, label 7 peeled off or melted by the discharge gas discharged from the discharge valve is attached to the surface of porous plate 5. In battery pack 100, an outer surface of porous plate 5 is blocked by label 7, and thus, it is possible to prevent foreign substances from entering the inside through through-hole 5a of porous plate 5. When the discharge gas is discharged from the discharge valve of battery cell 1, label 7 is peeled off by a pressure of the discharge gas passing through through-holes 5a of porous plate 5, or is melted and removed by the heat of the high-temperature discharge gas.

Second Exemplary Embodiment

Figure 8:
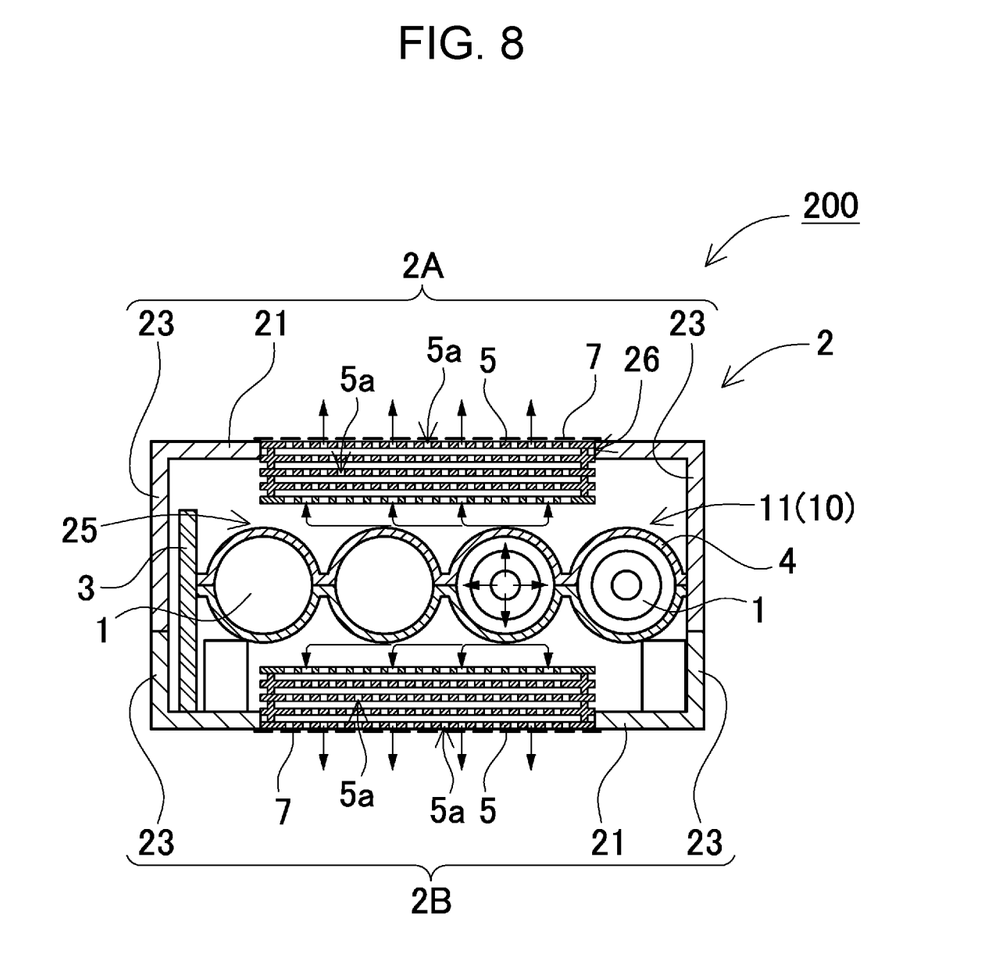
FIG. 8 is a vertical transversal cross-sectional view illustrating an internal structure of a battery pack according to a second exemplary embodiment of the present invention.

As illustrated in a cross-sectional view of FIG. 8, in battery pack 200, openings 26 are provided in surface plates 21 on both surfaces, and openings 26 are blocked by porous plates 5. Since porous plate 5 can be increased by increasing the opening area of opening 26, battery pack 200 can attenuate the energy of the discharge gas and exhaust the discharge gas to the outside by reducing through-holes 5a of porous plate 5 and increasing a number of through-holes.

INDUSTRIAL APPLICABILITY

The present invention can be effectively used for a battery pack that safely exhausts a discharge gas.

REFERENCE MARKS IN THE DRAWINGS 100, 200: battery pack
1: battery cell
2: case
2A: upper case
2B: lower case
3: circuit board
4: battery holder
5: porous plate
5A: planar porous plate
5B: intermediate porous plate
5a: through-hole
5b: protrusion
6: heat-resistant cover
7: label
8: expansion gap
10: battery block
11: battery assembly
21: surface plate
22: peripheral wall
23: side wall
24: end wall
25: diffusion space
26: opening

The invention claimed is:

1. A battery pack comprising:
   a battery cell having a discharge valve opened when an internal pressure of the battery cell exceeds a set pressure; and
   a case housing the battery cell,
   wherein
   the case includes an opening,
   the opening is blocked by a porous plate made of resin,
   the porous plate has a plurality of through-holes,
   an expansion gap of a discharge gas is defined by stacking a plurality of the porous plates each being the porous plate,
   the plurality of through-holes provided in each of the porous plates are arranged at non-facing positions not facing the plurality of through-holes provided in adjacent another porous plate, and
   the discharge gas of the discharge valve passes through the plurality of through-holes provided in the porous plates and the expansion gap and is discharged to an outside of the case.

2. The battery pack according to claim 1, wherein
   each of the porous plates stacked on top of each other includes a rectangular shape, and
   the porous plates are stacked on inside out with a diagonal line of the rectangular shape as a symmetric axis, and the through-holes of the porous plates stacked are arranged at non-facing positions.

3. The battery pack according to claim 2, wherein each of the porous plates has a square shape.

4. The battery pack according to claim 1, wherein the through-holes of the porous plates stacked on an inner side of the case are larger than the through-holes of the porous plates stacked on an outer side of the case.

5. The battery pack according to claim 1, wherein each of the porous plate is integrally molded with protrusions, and the expansion gap is defined in a state in which the porous plates are stacked.

6. The battery pack according to claim 1, wherein an inner diameter of each of the through-holes of each of the porous plates is equal to or more than 0.5 mm and is equal to or less than 3 mm.

7. The battery pack according to claim 1, wherein
   the case is a rectangular cuboid coupling with peripheral walls around a surface plate including a square shape,
   the battery cell is disposed in parallel with the surface plate, and is housed in a state in which a valve side end surface on which the discharge valve is provided faces an inside of a peripheral wall among the peripheral walls, and
   the porous plates are provided on the surface plate.

8. The battery pack according to claim 1, wherein in each of the porous plates, the through-holes are provided at intersections of a checkerboard lattice.

9. The battery pack according to claim 1, wherein a label peeled off or melted by the discharge gas discharged from the discharge valve is attached to a surface of the porous plate in the case.

10. The battery pack according to claim 1, wherein the battery cell is a non-aqueous electrolyte secondary battery.

11. The battery pack according to claim 10, wherein the battery cell is a lithium-ion battery.

* * * * *